United States Patent [19]
Skoglund et al.

[11] Patent Number: 5,716,701
[45] Date of Patent: Feb. 10, 1998

[54] PRESSURE-SENSITIVE ADHESIVE COMPOSITIONS HAVING IMPROVED PEEL FORCE RETENTION ON FLEXIBLE VINYL SUBSTRATES

[75] Inventors: Michael J. Skoglund; Shang Lee, both of Dublin, Ohio

[73] Assignee: Ashland Inc., Russell, Ky.

[21] Appl. No.: 419,215

[22] Filed: Apr. 10, 1995

[51] Int. Cl.$^6$ ............................................. C09J 7/02
[52] U.S. Cl. ................... 428/355 AC; 428/461; 428/463; 428/520; 428/522; 428/523
[58] Field of Search .................... 428/355, 461, 428/463, 522, 523, 520, 355 AC

[56] References Cited

U.S. PATENT DOCUMENTS

| | | |
|---|---|---|
| 2,976,203 | 3/1961 | Young et al. . |
| 4,822,676 | 4/1989 | Mudge . |
| 5,069,942 | 12/1991 | Anderson . |
| 5,316,762 | 5/1994 | Kiamil . |
| 5,368,843 | 11/1994 | Rennie . |

FOREIGN PATENT DOCUMENTS

| | | |
|---|---|---|
| 5548321A1 | 3/1992 | European Pat. Off. . |
| 57-143373 | 9/1982 | Japan . |

OTHER PUBLICATIONS

The Applications of Synthetic Resin Emulsions, H. Warson, Ernest Benn Limited, London 1972.

Development of Acrylic Latex Pressure Sensitive Adhesive for Plasticized PVC Films, Journal of Plastic Film & Sheeting, vol. 2—Apr. 1986.

Handbook of Adhesives, Second Edition, edited by Irving Skeist, copyright 1977 by Litton Educational Publishing, Inc.

Production Information, Pressure Sensitive Latexes, UCAR Latex 173 (Sep. 1982).

Polymers, Resins and Monomers, Rohm and Haas Company, 1982.

Rohm and Haas Company, Experimental Emulsion E–1031, Acrylic Emulsion for Pressure–Sensitive Adhesives (no date available).

Polymers, Resins and Monomers, RHOPLEX Pressure Sensitive Acrylic Emulsions for Adhesive Formulators, Rohm and Haas Company, 1987.

*Primary Examiner*—Jenna Davis
*Attorney, Agent, or Firm*—Mary E. Picken

[57] ABSTRACT

This adhesive for laminating vinyl face stock to solid substrates has good initial peel strength, retains peel strength and is emulsion polymerized and compounded in the absence of sodium or lithium cations.

7 Claims, No Drawings

PRESSURE-SENSITIVE ADHESIVE COMPOSITIONS HAVING IMPROVED PEEL FORCE RETENTION ON FLEXIBLE VINYL SUBSTRATES

Normally tacky and pressure-sensitive water-borne emulsion polymer adhesive compositions suitable for application to plasticized polyvinyl chloride film, having excellent retention of peel force strength, are emulsion polymerized and compounded in the essential absence of sodium and lithium cations.

BACKGROUND OF THE INVENTION

This invention relates to pressure sensitive adhesive compositions particularly suited for use as permanent adhesives on flexible vinyl substrates is such as plasticized polyvinyl chloride films.

Flexible vinyl films coated with pressure sensitive adhesive are used in many applications such as decorative vinyl laminations, decals, signage, and specialty tapes. Solvent-borne pressure sensitive adhesives have traditionally been employed in these applications. Environmental, health and safety concerns have encouraged development of new aqueous adhesive systems to replace traditional solvent based adhesives. The adhesive performance requirements for flexible vinyl film applications dictate that pressure sensitive adhesive coating exhibit sufficient tack and anchorage to both the vinyl film and substrate to prevent lamination failure in the intended application. The adhesive must also possess sufficient cohesive strength to prevent adhesive flow during vinyl film converting, storage, and use. Additionally, the aforementioned adhesive properties must not fall below required performance parameters while in contact with the plasticized vinyl film.

Diminution of pressure sensitive adhesive performance measurements while on flexible vinyl film is a well known problem. Flexible vinyl films are complex mixtures containing polyvinyl chloride resin, fillers, plasticizers, stabilizers, lubricants and other processing aids. The plasticizers are known to migrate from the flexible vinyl film into the adhesive coating and degrade pressure sensitive adhesive performance (Graziano, L. C. and Sjostrand, E., "Development of Acrylic Latex Pressure Sensitive Adhesive for Plasticized PVC Films", Journal of Plastic Film & Sheeting, Vol. 2, April 1986, pages 95–110).

Specific monomer combinations that yield specific copolymer compositions have been proposed as having superior resistance to plasticizer migration and retention of initial adhesive properties. For example, according to Mudge U.S. Pat. No. 4,822,676, emulsion polymers containing specific compositions of vinyl ester, acrylic ester, ethylene, tertiary octyl acrylamide, and monocarboxylic acid monomers afford a copolymer with superior performance when coated on plasticized polyvinyl chloride film. Mudge uses the group IA metal cation sodium found in sodium acetate, sodium alkyl aryl polyethylene oxide sulfate, and sodium formaldehyde sulfoxylate.

U.S. Pat. No. 5,316,762 Kiamil describes a water resistant medical adhesive polymerized in the presence of ammonium salt surfactants in the absence of metal salts. This adhesive has good tack and is not further compounded with tackifiers or plasticizers.

According to Warson, *Synthetic Resin Emulsions, Surfactants and Stabilizers*, 1972, using ammonia (as the alkali) in making soaps (surfactants) as salts of fatty acids has the advantage that on drying an emulsion no water-soluble materials remain but only an insoluble fatty acid remains. The volatility of ammonia has certain disadvantages, especially when used with polymer emulsions, since loss of ammonia will cause a drop in pH, and may lead to instability. During drying of a film premature instability may occur, or as with a coating on steel, "flash" corrosion, caused by premature drop in pH. In consequence, ammonia is often replaced by amines. The removal of group IA metals from a polysiloxane coating by ion exchange to improve adhesion under conditions of high humidity is described in U.S. Pat. No. 5,069,942 Anderson.

SUMMARY OF THE INVENTION

It has now been found that coater ready emulsion polymer pressure sensitive adhesives prepared in the substantial absence of common metal cations of group IA, such as sodium, possess superior retention of initial peel force properties when coated and aged on flexible vinyl film. In this invention the phrase "substantial absence" means less than about 150 parts sodium cation or lithium cation per million parts dry weight of the adhesive film. These trace amounts of cation are from sodium formaldehyde sulfoxylate chaser chemicals used in the emulsion polymerization step. We have found that cations may be present up to 200 parts per million parts adhesive film dry weight without deleterious effect on properties.

DESCRIPTION OF THE INVENTION

Emulsion polymers are commonly prepared with salts. These salts may be initiators (i.e. persulfate salts), ionic surfactants, buffers, thickeners, and alkalis. Ammonium, sodium, or potassium salts are commonly used in the commercial manufacturing of emulsion polymers. The effect of cation type on adhesive performance was demonstrated by selection of different ionic initiators, reaction buffers, ionic emulsifiers, and basification agents when polymerizing and formulating a coater ready aqueous emulsion pressure sensitive adhesive.

In the Examples all measurements are in the metric system unless otherwise indicated. All references mentioned herein are specifically incorporated by reference.

EXAMPLE 1

An aqueous acrylic emulsion pressure sensitive adhesive composition prepared or "emulsion polymerized" in the absence of group IA metal cations and containing only ammonium cations was prepared as follows.

| REACTOR CHARGE | pphm | grams |
| --- | --- | --- |
| Deionized Water | 50.0 | 815.2 |
| MONOMER EMULSION | pphm | |
| Deionized Water | 25.0 | 407.6 |
| RHODAPEX CO-436 | 2.0 | 32.6 |
| Aqua Ammonia 29% | 1.0 | 16.3 |
| Acrylic Acid | 2.0 | 32.6 |
| 2-Ethylhexyl Acrylate | 45.0 | 733.7 |
| n-Butyl Acrylate | 45.0 | 733.7 |
| Styrene | 8.0 | 130.4 |
| INITIATOR | pphm | |
| Ammonium Persulfate | 1.0 | 16.3 |
| RINSE WATER | pphm | |

|  | grams |
|---|---|
| Deionized Water | 5.0 |
| COMPOUNDING | pph |
| Emulsion Polymer C5708-136 | 100.0 |
| Aqua Ammonia 29% | 0.8 |
| PLURONIC L-101 | 3.0 |

Deionized water had a conductivity of 1.0 µS or less.
RHODAPEX CO-436 surfactant is an ammonium salt of nonylphenol-4-ethoxy-sulfate (58 wt %) in water (27 wt %) and ethanol (15 wt %) supplied by Rhone-Poulenc.
PLURONIC L-101 is a nonionic ethylene oxide propylene oxide block polymer wetting agent supplied by BASF Corporation.

A jacketed PYREX reactor equipped with nitrogen purge, stirrer, and addition ports was charged with deionized water which was heated to 80° C. A monomer emulsion was prepared. The initiator was added to the reactor and the monomer emulsion was added at a constant rate over a three hour period. The resulting emulsion polymer was held at 85° C. for one hour then cooled to 30° C., filtered through cheese cloth and labeled C5708-136.

Emulsion polymer C5708-136 afforded a nonvolatile content of 55.2 wt %, pH of 5.7, Brookfield RV viscosity of 60 cps at 20 rpm, 0.18 grams of filtered coagulum on cheese cloth, 9 ppm on 100 mesh filter and 10 ppm on 200 mesh filter.

A coater ready pressure sensitive adhesive was made by further compounding C5708-136 emulsion polymer with ammonia and nonionic PLURONIC wetting agent to afford pressure sensitive adhesive C5708-142A having a pH of 9.4 and Brookfield viscosity of 570 cps at 20 rpm.

EXAMPLE 2

An aqueous acrylic emulsion pressure sensitive adhesive composition made exclusively with group IA metal cations and containing sodium cations was emulsion polymerized as follows.

|  |  | grams |
|---|---|---|
| REACTOR CHARGE | pphm |  |
| Deionized Water | 50.0 | 815.2 |
| MONOMER EMULSION | pphm |  |
| Deionized Water | 23.4 | 380.9 |
| RHODAPEX CO-433 | 4.0 | 65.2 |
| Sodium Hydroxide | 0.7 | 11.1 |
| Acrylic Acid | 2.0 | 32.6 |
| 2-Ethylhexyl Acrylate | 45.0 | 733.7 |
| n-Butyl Acrylate | 45.0 | 733.7 |
| Styrene | 8.0 | 130.4 |
| INITIATOR | pphm |  |
| Sodium Persulfate | 1.0 | 16.3 |
| RINSE WATER | pphm |  |
| Deionized Water | 5.0 | 81.5 |
| COMPOUNDING | pph |  |
| Emulsion Polymer C5708-138 | 100.0 |  |
| Sodium Hydroxide Solution 17% | 1.6 |  |
| PLURONIC L-101 | 3.0 |  |

Deionized water had a conductivity of 1.0 µS or less.
RHODAPEX CO-433 is a sodium salt of nonyl-4-ethoxy-sulfate solution (28 wt % active) in water (72 wt %) supplied by Rhone-Poulenc.
PLURONIC L-101 is a nonionic ethylene oxide propylene oxide block polymer wetting agent supplied by BASF Corporation.

A jacketed PYREX reactor equipped with nitrogen purge, stirrer, and addition ports was charged with deionized water which was heated to 80° C. A monomer emulsion was prepared. The initiator was added to the reactor and the monomer emulsion was added at a constant rate over a three hour period. The resulting emulsion polymer was held at 85° C. for one hour then cooled to 30° C., filtered through cheese cloth and labeled C5708-138.

Emulsion polymer C5708-138 afforded a nonvolatile content of 55.2 wt %, pH of 5.1, Brookfield RV viscosity of 60 cps at 20 rpm, 0.24 grams of filtered coagulum on cheese cloth, 7 ppm on 100 mesh filter and 9 ppm on 200 mesh filter.

A coater ready pressure sensitive adhesive was made by further compounding C5708-138 emulsion polymer with the ammonia and nonionic PLURONIC wetting agent to afford pressure sensitive adhesive C5708-143 having a pH of 8.7 and Brookfield viscosity of 250 cps at 20 rpm.

EXAMPLE COMPARISON

The coater ready pressure sensitive adhesives of Examples 1 and 2 were coated on H. P. Smith POLYSILK 8024 release liner at a film thickness of 1.0±0.1 mil and transferred to a 3 mil white calandered vinyl film. The pressure sensitive adhesive properties of the films were evaluated in accordance with Pressure Sensitive Tape Council (PSTC) 1 Peel Force measurement with a 15 minute dwell and PSTC 7 holding power shear test methods and a Quick Stick PSTC-5 measurement after 24 initially and after aging the laminations eight days at 158 F.

|  | Example 1 Ammonium PSA | Example 2 Sodium PSA |
|---|---|---|
| Initial Adhesive Performance 180° Peel Force (lbs/in) |  |  |
| 15 min. dwell | 2.1 | 0.4 |
| 24 hr dwell | 2.3 | 1.8 |
| Quick Stick (lbs/in) | 4.1 | 0.4 |
| Holding Power (Mins.) | 2 | 38 |
| Aged Adhesive Performance 180° Peel Force (lbs/in) |  |  |
| 15 min. dwell | 1.3 | 0.1 |
| 24 hr dwell | 1.8 | 0.1 |
| Quick Stick (lbs/in) | 1.7 | 0.2 |
| Holding Power (Mins.) | 7 | 34 |

This comparison demonstrates the influence that cation type has on pressure sensitive adhesive performance. The adhesive of example 1, emulsion polymerized and compounded in the absence of Group IA metal cation exhibited a PSTC 1 peel force retention of 78% (24 hr dwell). The adhesive emulsion polymerized and compounded exclusively with sodium cations exhibited a PSTC 1 peel force retention of only 6% (24 hr dwell).

This example confirms that emulsion polymerization in the absence of sodium cation provides a permanent pressure sensitive adhesive having better than 70% peel force retention on aging.

We claim:

1. A laminate of flexible vinyl face stock, pressure sensitive adhesive film, and metal substrate, said laminate having initial PSTC 1 peel strength, PSTC 1 peel strength retention on aging, said film consisting of the dried residue of an aqueous emulsion pressure sensitive adhesive copolymer of alkyl acrylates, styrene, and acrylic acid polymerized in the substantial absence of sodium or lithium cations in the presence of ammonium group containing surfactant.

2. A laminate of flexible vinyl face stock, pressure sensitive adhesive film, and metal substrate, said laminate having initial PSTC 1 peel strength; PSTC 1 peel strength retention on aging, said film consisting of the dried residue of an aqueous emulsion pressure sensitive copolymer of alkyl acrylates, styrene and acrylic acid compounded using an ammonium group containing surfactant to a coater ready adhesive in the substantial absence of sodium or lithium cations.

3. A laminate of flexible vinyl face stock, pressure sensitive adhesive film, and metal substrate, said laminate having initial PSTC 1 peel strength, PSTC 1 peel strength retention on aging, said film consisting of the dried residue of an aqueous emulsion pressure sensitive adhesive emulsion copolymer of alkyl acrylates, styrene and acrylic acid polymerized in the substantial absence of sodium or lithium cations using an ammonium group containing surfactant and compounded into a coater ready adhesive in the substantial absence of sodium cation or lithium cation.

4. The laminate of claim 3 comprising plasticized vinyl face stock.

5. The laminate of claim 3 wherein said adhesive is emulsion polymerized and compounded in the presence of ammonium cation.

6. The laminate of claim 3 wherein said adhesive composition contains less than 150 parts Group 1 metal cation per million parts dry weight.

7. The laminate of claim 1 wherein said surfactant is the ammonium salt of nonyl-4-ethoxy sulfate.

* * * * *